US011487283B1

(12) United States Patent
Chasen et al.

(10) Patent No.: US 11,487,283 B1
(45) Date of Patent: Nov. 1, 2022

(54) AIRCRAFT WITH DISTRIBUTED POWER SYSTEM, DISTRIBUTED CONTROL SYSTEM, AND SAFE DEPLOYMENT MECHANISM FOR BALLISTIC RECOVERY SYSTEM

(71) Applicant: LIFT Aircraft Inc., Austin, TX (US)

(72) Inventors: Matthew David Chasen, Austin, TX (US); Balazs Kerulo, Budapest (HU)

(73) Assignee: Lift Aircraft Inc., Austin, TX (US)

( * ) Notice: Subject to any disclaimer, the term of this patent is extended or adjusted under 35 U.S.C. 154(b) by 385 days.

(21) Appl. No.: 16/708,283

(22) Filed: Dec. 9, 2019

Related U.S. Application Data

(60) Provisional application No. 62/777,668, filed on Dec. 10, 2018.

(51) Int. Cl.
| | | |
|---|---|---|
| *G05D 1/00* | (2006.01) | |
| *B64C 37/00* | (2006.01) | |
| *B64C 27/00* | (2006.01) | |
| *G05D 1/10* | (2006.01) | |
| *B64D 27/24* | (2006.01) | |
| *B64D 17/80* | (2006.01) | |

(52) U.S. Cl.
CPC ......... *G05D 1/0061* (2013.01); *B64C 27/006* (2013.01); *B64C 37/00* (2013.01); *B64D 17/80* (2013.01); *B64D 27/24* (2013.01); *G05D 1/102* (2013.01); *G05D 1/1064* (2019.05)

(58) Field of Classification Search
CPC .... G05D 1/0061; G05D 1/1064; G05D 1/102; B64C 27/006; B64C 37/00; B64C 25/54; B64C 2201/185; B64D 17/80; B64D 27/24
See application file for complete search history.

(56) References Cited

U.S. PATENT DOCUMENTS

| | | | |
|---|---|---|---|
| 2008/0173769 A1* | 7/2008 | Tharisayi | B64C 29/0033 244/7 R |
| 2016/0034363 A1* | 2/2016 | Poledna | G05B 19/0428 714/4.2 |
| 2017/0267367 A1* | 9/2017 | Senkel | B64C 25/56 |

* cited by examiner

*Primary Examiner* — Rodney A Bonnette
(74) *Attorney, Agent, or Firm* — Amsel IP Law PLLC; Jason Amsel

(57) ABSTRACT

An electric aircraft comprises a single passenger seat, vertical takeoff and landing capable rotorcraft with an amphibious undercarriage for ground or water landing and takeoff. An electrical power system includes an independent battery for each motor with quick-swap mechanism to enable drained batteries to be easily removed for external charging and swapped for a charged replacement battery. A ballistic recovery system may be deployed to safely land the aircraft in the event of an emergency and may be manually deployed in response to the passenger activating a deployment mechanism integrated into handles within the cockpit. An on-board flight control system includes an automated flight controller that places constraints on flight maneuvers, and a manual flight controller provides a passenger with a limited level of control over the flight.

22 Claims, 8 Drawing Sheets

100

100

AIRCRAFT WITH DISTRIBUTED POWER SYSTEM, DISTRIBUTED CONTROL SYSTEM, AND SAFE DEPLOYMENT MECHANISM FOR BALLISTIC RECOVERY SYSTEM

CROSS-REFERENCE TO RELATED APPLICATIONS

This application claims the benefit of U.S. Provisional Patent Application No. 62/777,668 filed on Dec. 10, 2018, which is incorporated by reference herein.

BACKGROUND

Ultralight aircrafts are a class of aerial vehicles that meet certain weight specifications defined by the various jurisdictions in which they operate. For example, in the United States, an ultralight aircraft is defined as an aircraft weighing less than 254 lbs., with some extra weight allowed for amphibious landing gear and ballistic parachute systems. Obtaining ultralight aircraft classification is desirable because in most jurisdictions, it enables operation without limited or no licensing requirements. However, a challenge exists in ensuring that an ultralight aircraft has adequate safety features while still meeting the weight requirements.

SUMMARY

An electric aircraft includes an undercarriage, a cockpit, a canopy, and on-board electronic flight controller. The undercarriage comprises a plurality of floats enabling floatation of the electric aircraft. The cockpit is over the undercarriage and includes a seat for securing a passenger within the electric aircraft and a windshield at least partially enclosing the cockpit. The canopy is over the cockpit and comprises a structural frame and a plurality of distributed lifting devices. The plurality of distributed lifting devices each include a rotor to provide lift to the electric aircraft, a motor to drive rotation of the rotor, and a battery pack to supply power to the motor. The on-board electronic flight control system controls the distributed lifting devices in response to flight controls to carry out a flight of the electric aircraft.

In an embodiment, the battery pack provides power to one and only one motor. Furthermore, in an embodiment, the battery pack includes a first quick-swap mechanism for securely mating to a reciprocally structured second quick-swap mechanism of a terminal positioned on a portion of the structural frame below the motor. The first quick-swap mechanism may comprise a set of cylindrical tenon studs on the battery pack that mate with corresponding keyhole slots of the terminal. Furthermore, a first electrical connector on the battery pack mates with a second electrical connector of the terminal to establish an electrical connection when the first quick-swap mechanism of the battery pack is secured to the second quick-swap mechanism of the terminal. A safe lock mechanism may include a pin insertable through a respective pin sleeve on the battery pack and the terminal that are aligned when the first quick-swap mechanism of the battery pack is secured to the second quick-swap mechanism of the terminal.

In an embodiment, the plurality of floats comprises a central float directly under the cockpit, and four side floats distributed around the central float. In an alternative embodiment, the plurality of floats comprises a central float directly under the cockpit, and six side floats distributed around the central float.

In an embodiment, the electric aircraft further comprises a ballistic recovery system for landing the electric aircraft in an emergency event. The ballistic recovery system includes a parachute deployable from a compartment on the canopy, and a deployment mechanism for causing the parachute to deploy. The deployment mechanism comprises a pair of push buttons positioned on respective handles within the cockpit proximate to opposite edges of the windshield. The deployment mechanism to deploy the parachute in response to the push buttons being concurrently activated for at least a predefined time period. In an embodiment, the on-board electronic flight control system is configured to disconnect power to the motors in response to deployment of the parachute.

In an embodiment, the electric aircraft further comprises triple redundant on-board sensors for sensing data relevant to the flight. The triple redundant sensors include a primary sensor and two or more backup sensors that activate in response to failure of the primary sensor.

In an embodiment, the on-board electronic flight control system comprises an autonomous flight controller to automatically control at least a first aspect of the flight of the electric aircraft in accordance with a predefined flight plan, and a manual flight controller to enable the passenger to provide manual control inputs to control at least a second aspect of the flight. Here, the autonomous flight controller may automatically impose a set of constraints on the flight in accordance with the predefined flight plan, and the manual flight controller enables the passenger to control the flight within the set of constraints imposed by the autonomous flight controller. In an embodiment, the autonomous flight controller automatically imposes the set of constraints by performing at least one of the following actions: controlling the electric aircraft to maintain a position within a predefined geographic region; controlling the electric aircraft to avoid a collision; controlling the electric aircraft to avoid entering a geographic area having over a threshold level of congestion; controlling the electric aircraft to land according to a set of predefined landing maneuvers; controlling the electric aircraft to initiate landing in response to predefined landing criteria; controlling the electric aircraft to takeoff according to a set of predefined landing maneuvers; and controlling the electric aircraft to initiate takeoff in response to takeoff criteria.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The figures and the following description relate to embodiments by way of illustration only. From the following discussion, alternative embodiments of the structures and methods disclosed herein will be readily recognized as viable alternatives that may be employed without departing from the principles of the disclosure.

Figure 1:
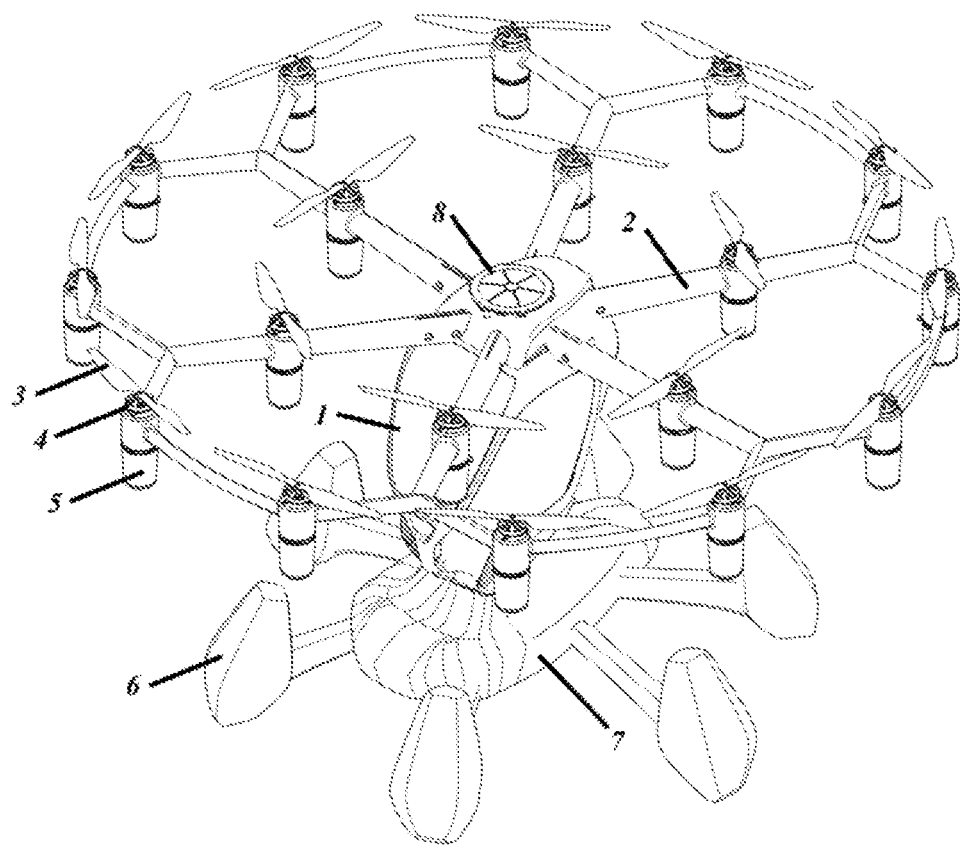
FIG. 1 is a perspective view of an embodiment of an electric aircraft.
Figure 2:
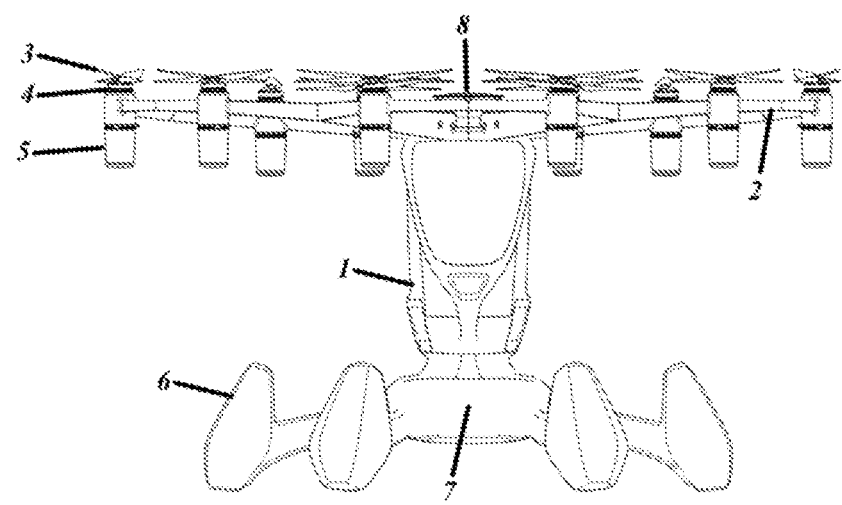
FIG. 2 is a front view of an embodiment of an electric aircraft.
Figure 3:
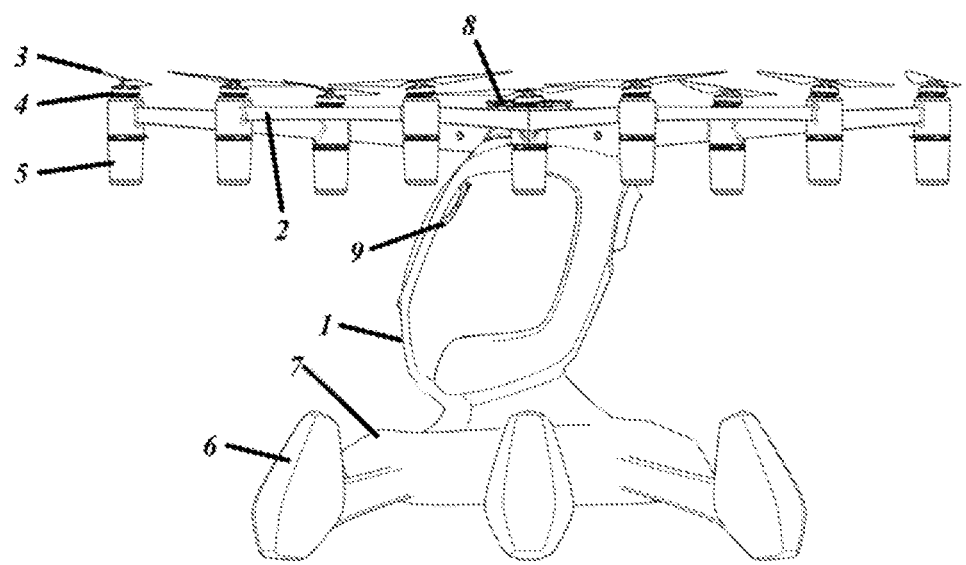
FIG. 3 is a side view of an embodiment of an electric aircraft.

FIGS. 1-3 illustrate an isometric view, a front view, and a side view respectively of a passenger-carrying aircraft 100. The aircraft 100 may comprise a single passenger seat, vertical takeoff and landing capable rotorcraft with an amphibious undercarriage for ground or water landing and takeoff. In an embodiment, the aircraft 100 meets the qualification for ultralight aircraft classification in at least the United States. The aircraft 100 includes a canopy 1 including a cockpit with a single passenger seat and a windshield. The aircraft 100 can be piloted by the on-board passenger using an on-board joystick, by a ground controller via radio link to the aircraft 100, by an autonomous flying system (e.g., to autonomously fly a preset route), or by a combination thereof controlling a fully electronic flight control system. A structural frame 2 comprises a semi-open structure above the cockpit with 18 independent, electrically powered lifting devices. The structural frame 2 may comprise a carbon composite structural frame or other suitable material that is sufficiently strong and lightweight. The lifting devices each include a rotor 3, a motor 4, and a battery pack 5. The motors 4 may comprise, for example, brushless DC motors that drive respective direct-drive rotors 3 using power provided by the attached battery packs 5. The electrical power system includes an independent battery 5 for each motor 4 with quick-swap mechanism to enable drained batteries 5 to be easily removed for external charging and swapped for a charged replacement battery 5, as will be described in further detail below. The cockpit rests on an amphibious undercarriage consisting of one central float 7 and six side floats 6 that enable the aircraft to float on water. In alternative embodiments, a different number of floats 6 may be used (e.g., a central float 7 and four side floats 6). The aircraft 100 is also equipped with a ballistic recovery system 8 that may be deployed to safely land the aircraft 100 in the event of an emergency (e.g., loss of lift or flight control). For example, the ballistic recovery system 8 may comprise a parachute that deploys from a compartment in the top of a central portion of the frame 2 above the cockpit. The ballistic recovery system 8 may be manually deployed in response to the passenger activating a deployment mechanism integrated into handles 9 within the cockpit as will be described in further detail below.

The architecture of the aircraft 100 utilizes 18 relatively small rotors 3 to provide lift, which beneficially improves stability and safety relative to other aircrafts that instead employ a smaller number of larger rotors. In this distributed propulsion system, a relatively small amount of available thrust is lost in the event of single failure of a motor 4 or rotor 3. Furthermore, the distributed power system that includes an independent battery 5 for each motor 4 and rotor 3 limits loss of thrust to a single rotor 3 in the event of a single battery failure. Furthermore, the loss of a single battery 5 at most minimally impacts the power drain demand on the remaining batteries. Additionally, the placement of each battery 5 directly adjacent to the motor 4 that it drives eliminates the need for high amperage power lines from a centralized battery and eliminates the possibility of a central power line failure that could completely shut down the aircraft 100. Further still, the distributed battery system reduces overall wiring and power distribution systems typically employed in centralized battery systems, thereby reducing the relative weight of the aircraft 100.

In an embodiment, an on-board electronic flight control system 810 (shown in FIG. 8) controls the motors 4 to drive the rotors 3 of the aircraft 100 in response to a flight control inputs 816 (which may be provided manually by a passenger in the aircraft 100, by ground control personnel, by an autonomous flight system 814, or a combination thereof) in order to carry out the intended flight path and achieve sufficient stability. For example, the electronic flight control system 810 may comprise a fly-by-wire system that automatically determines, independently for each motor 4, an amount of power to apply to each motor 4 that will appropriately control a rotation speed of a connected rotor 3 to ensure stable flight while carrying out the desired flight path. The electronic flight control system 810 may comprise various sensors 820 integrated with the aircraft 100 to provide feedback to the electronic flight control system 810 relating to environmental conditions and a real-time state of the aircraft 100. For example, sensors 820 may include an inertial measurement unit (IMU) that may include an accelerometer, gyroscope, or other motion sensor to track motion of the aircraft 100, environmental sensors such as temperature sensors, pressure sensors, wind sensors, rain sensors, etc., cameras that capture image data of the aircraft 100 or surrounding environment, or other sensors useful to determine how to control the rotors 3 to achieve the desired flight and stability. For example, the aircraft 100 may automatically adjust based on detected wind speed or other factors. The aircraft 100 may include redundant sensors 820 (e.g., triple redundant sensors) such that backup sensors may be employed in the event that a primary sensor fails. In an embodiment, a backup sensor may be automatically activated in response to failure of the primary sensor.

In an embodiment, the on-board electronic flight control system 810 includes a processor and a non-transitory computer-readable storage medium storing instructions that when executed cause the on-board flight control system 810 to carry out the functions described herein. The on-board flight control system 810 may furthermore include a wireless communication system to enable the on-board flight control system to communicate with a ground control system. For example, the wireless communication system may enable flight control signals to be transmitted from a ground control system to the on-board electronic flight control system 810 and may enable sensor data or other telemetry data to be communicated to the ground control system. Furthermore, the wireless communication system may enable voice communications to be transmitted between the on-board electronic flight control system 810 and the ground control system to enable a passenger to communicate with ground control personnel.

In an embodiment, the on-board electronic flight control system 810 comprises an autonomous flight controller 814 to automatically control at least a first aspect of the flight of the electric aircraft 100 in accordance with a predefined flight plan, and a manual flight controller 812 to enable the passenger to provide manual control inputs to control at least a second aspect of the flight.

In an embodiment, the automated flight system 814 may have full control of the flight of the aircraft 100, for example, to execute a pre-planned flight path. Alternatively, the automated flight system 814 may augment manual control inputs (e.g., provided by the passenger via a control joystick, a voice command, or other input) to enable the passenger to have a level of control of the aircraft while enforcing certain constraints. For example, in an embodiment, the flight control system 810 may generally control the aircraft 100 according to manual inputs from the passenger if they meet certain flight constraints, but the autonomous flight system 814 may prevent the aircraft from leaving a certain predefined geographic boundary (e.g., defining a three-dimensional volume) or taking other disallowed actions (e.g., exceeding predefined maximum speed, exceeding a maximum bank angle, etc.). For example, the autonomous flight control system 814 may override manual inputs that may be violate one of the constraints. In another example, the autonomous flight system 814 may take automatic action to avoid collisions with other objects that are detected based on the sensor data or that are at known fixed locations. Here, the flight control system 814 may override manual flight control inputs when appropriate to avoid such collisions. In yet another example, the flight control system 814 may detect congested areas in which a significant number of other aircrafts are present (e.g., based on ground telemetry data), and prevent the aircraft 100 from entering those congested areas, overriding manual controls when appropriate. In another example, the passenger may interact with the flight control system 814 to cause the aircraft 100 to take certain actions by autonomous control. For example, the passenger may request (via voice control or other control input) that the aircraft 100 automatically takeoff or land, and the flight control system 814 may implement the takeoff or landing automatically without the passenger manually controlling the aircraft 100 through these maneuvers. In another example, the passenger may provide a voice command or other control input to cause the aircraft to ascend or descend to a particular requested altitude or navigate to a particular requested geographic location. Furthermore, the flight control system 814 may automatically control the aircraft to return to a designated safe location in response to detecting that the batteries 5 are running low.

In an embodiment, a ground flight controller may also be present that may transmit control signals to control flight of the electric aircraft 100 using teleoperation. In an embodiment, the ground flight controller may override manual controls performed by a passenger in the electric aircraft. Furthermore, the ground flight controller may override the on-board autonomous flight controller 814, and thus may cause the electric aircraft 100 to take actions that may otherwise violate constraints set by the autonomous flight controller 814. In this manner, a human ground controller may optionally take control of the aircraft 100 (e.g., in case of an emergency or failure of the autonomous flight controller).

In an embodiment, the flight control system 810 is triple redundant. In this case, if the primary flight control system fails, one of the backup systems can seamlessly take over.

Distributed Battery System

Figure 4:
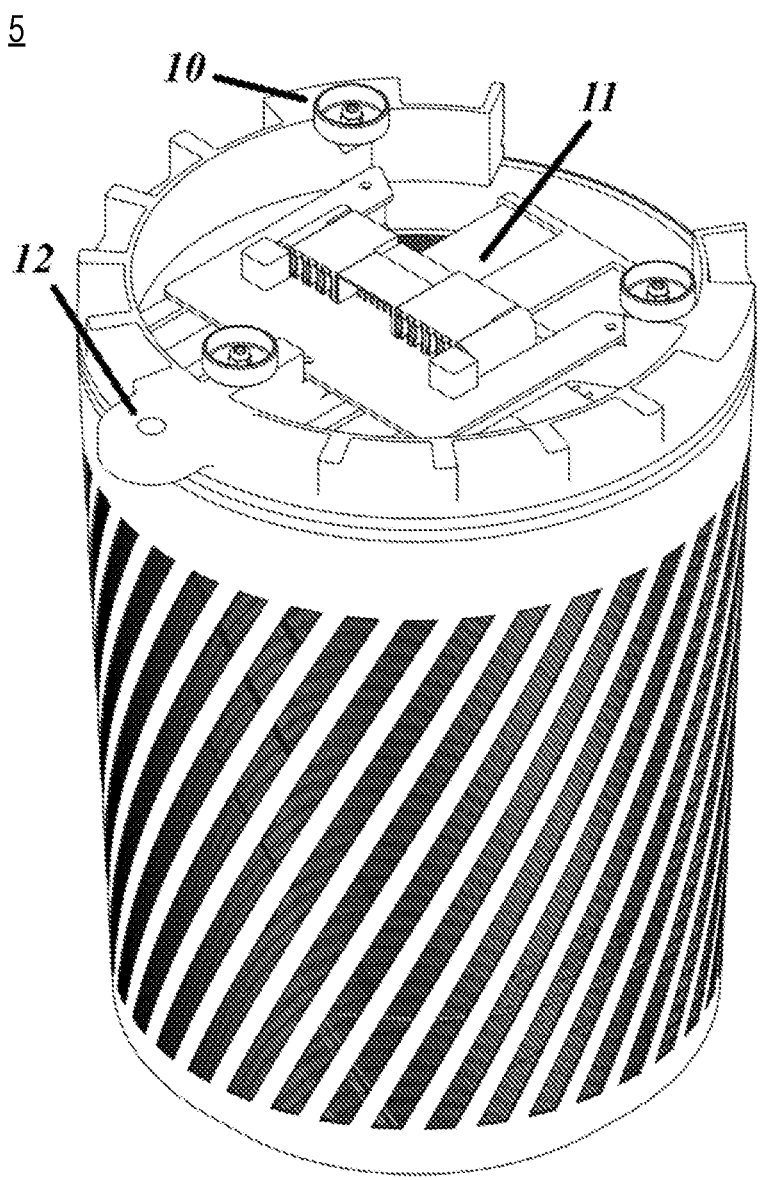
FIG. 4 is an example embodiment of a battery pack for an electric aircraft.
Figure 5:
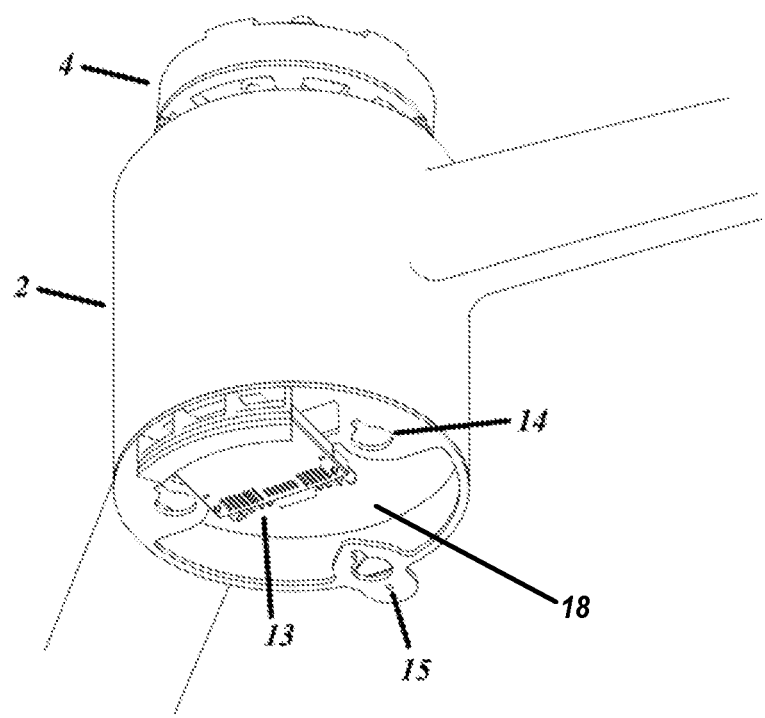
FIG. 5 is an example embodiment of a battery pack terminal for an electric aircraft.
Figure 6:
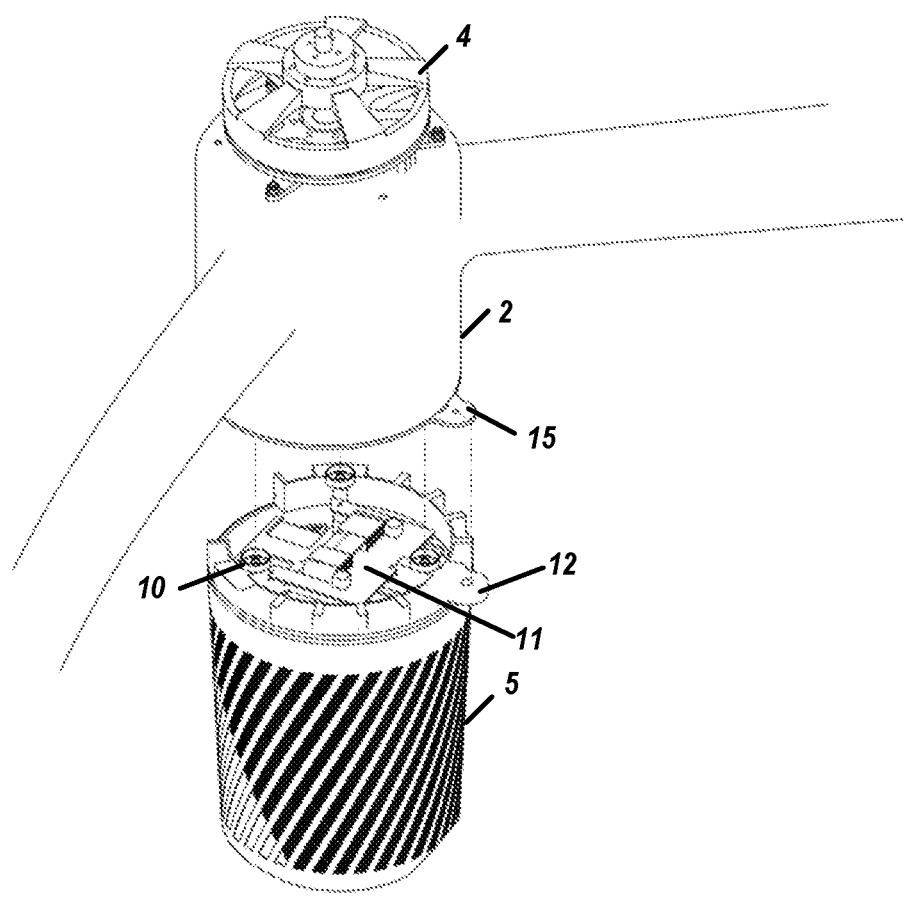
FIG. 6 is a diagram illustrating a quick-swap mechanism for a battery pack and terminal in an electric aircraft.

FIGS. 4-6 illustrates an example embodiment of a distributed power system for the aircraft 100. Particularly, FIG. 4 illustrates an example embodiment of a battery pack 5, FIG. 5 illustrates an example embodiment of a terminal 18 of the structural frame 2 connected to the motor 4 for connecting to a battery pack 5, and FIG. 6 illustrates an alignment between a battery pack 5 and the terminal 18 for connecting or disconnecting a battery 5 according to a quick-swap mechanism. Power lines between the terminal 18 of the structural frame 2 and the motor 4 provide a power connection between the terminal 18 and the motor 4 to drive the motor 4 when the battery 5 is connected to the terminal 18.

In the distributed battery system, each battery 5 connects to and provides power to only a single motor 4. Thus, the maximum power that is to be transmitted by electric wires within the frame 2 between the terminal 18 and the motor 4 are relatively low compared to an aircraft using a centralized battery system with high power lines. In the aircraft 100, the power lines between the batteries 5 and the motors 4 may be relatively thinner wires, operate at relative lower temperatures, and operate with bottleneck-free power routing. Furthermore, due to the low power transfer demand, an embodiment of the aircraft 100 does not include switches, relays, or fuses in the power distribution system to reduce weight and failure points.

The battery packs 5 are each removable from the aircraft 100 and can be charged externally, beneficially eliminating the need for a charging system integrated into the aircraft 100 and reducing overall weight, complexity, and points of failure. Furthermore, the removable battery system enables batteries 5 to be quickly swapped out for charged batteries, thus avoiding having to ground the aircraft 100 while the batteries 5 recharge.

Each battery 5 includes a quick-swap securing mechanism that enables a battery 5 to be quickly attached and detached from the aircraft 100 so that depleted batteries 5 can be removed and swapped for charged batteries 5. In an embodiment, the quick-swap mechanism includes a set of cylindrical tenon studs 10 (e.g., three studs 10) on the battery 5, that fit into corresponding keyhole slots 14 of the terminal 18 of the structural frame 2 below the motor 4. To install a battery 5, the battery 5 is positioned to align the studs 10 with the slots 14 as illustrated in FIG. 6. The studs are 10 initially slid upward into the large portions of the slots 14. In this position, the electronic connector 11 of the battery 5 and the reciprocal electronic connector 13 of the motor 4 are not yet connected. The keyhole shape of the slots 14 allows for only one horizontal degree of freedom, which enables the battery 5 to be moved (e.g., approximately one-half inch) horizontally towards the center of the terminal 18. The studs 10 keep the battery 5 in the appropriate vertical position while being slid horizontally to ensure proper alignment between the respective connectors 11, 13. Upon sliding the battery 5 horizontally towards the small portion of the keyhole slots 14, the connectors 11, 13 are mated together to provide the electrical connection and additional structural support. When the connectors 11, 13 are properly connected, the battery 5 is substantially concentric with the terminal 18. In this position, a pin sleeve 12 protruding from an outer perimeter of the top surface of the battery 5 aligns with a pin sleeve 15 of the terminal 18 of the motor 4. A clevis pin (not shown) can be inserted through the respective pin sleeves 12, 15 to safelock the battery 5 in place and prevent the battery 5 from falling out, thus keep the connection intact.

Safety Parachute Deployment Device

Figure 7:
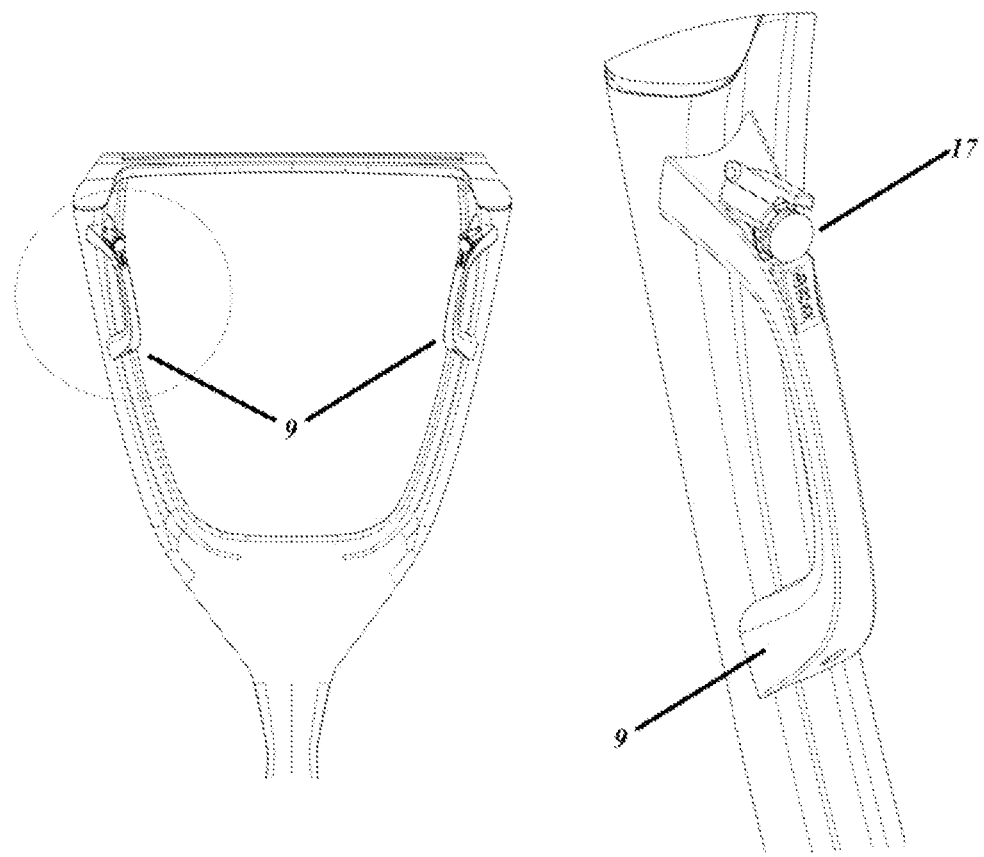
FIG. 7 is an example embodiment of a deployment mechanism for a ballistic recovery system of an electric aircraft.
Figure 8:
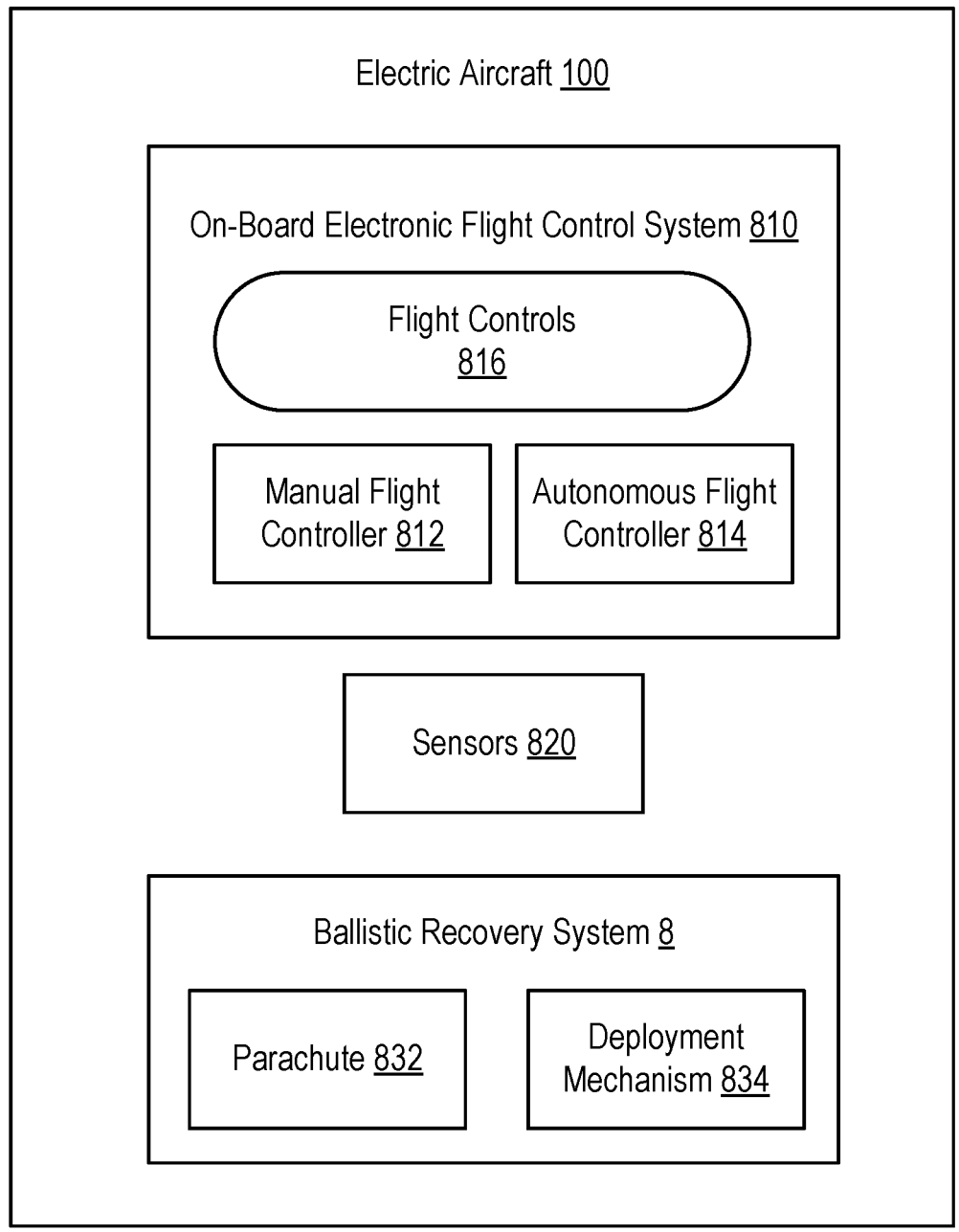
FIG. 8 is a block diagram for an electric aircraft.

FIG. 7 illustrates an example embodiment of a mechanism for deploying a ballistic recovery system (BRS) 8 (also shown in FIG. 8). The BRS 8 comprises a parachute 832 in a compartment on top of the cockpit that can be deployed upon loss of lift or another unrecoverable loss of control. Since the BRS 8 is usually deployed when the aircraft is already stalling, the g-forces on the occupants may go as high as 6-9 g-s. To avoid excessive strain on the passenger upon deployment of the BRS 8, the deployment mechanism 834 for the BRS 8 is structured in a manner that forces (or at least encourages) the passenger to be positioned in a safe posture upon deployment. For example, the deployment mechanism 834 is structured such that when activating it, the passenger is likely to be positioned in a safe posture with limbs inside the canopy frame 1 and a straight spine. Furthermore, the deployment mechanism is structured to in a manner that is highly unlikely to be deployed accidentally.

In an embodiment, the deployment system 834 for the BRS 8 includes a pair of push buttons 17 on an upper portion of hand rails 9 positioned on an interior of the cockpit in an upper position on windshield frames of either side of the front windshield. The BRS 8 is deployed upon the passenger activating both push buttons 17 concurrently (e.g., for at least a threshold period of time). The most instinctive way of activating the push buttons 17 is to grab both hand rails 9 with the hands while simultaneously pushing the buttons 17 with the thumbs. In this position, the passenger is likely to be in a safe posture with straight spine, limbs inside the cockpit, and hands held tight. Furthermore, unintentional activation is highly unlikely.

In an embodiment, BRS deployment automatically cuts off power to all 18 motors 4 at once. The on-board flight control system 810 will furthermore notify ground personnel via a radio telemetry channel to indicate deployment of the BRS 8, and may furthermore provide other telemetry data from the aircraft 100 to enable ground personnel to best respond.

Distributed Control System

In an embodiment, the on-board flight control system 810 of the aircraft 100 includes a dedicated control channel from the on-board flight control system 810 to each individual motor 4. In the event of a control channel failure, only a single motor is affected, thereby improving flight stability and safety.

In-Flight User Interface

In an embodiment, the aircraft 100 may include a display screen with an in-flight user interface for enabling a passenger to interact with the aircraft 100 during flight. In this embodiment, the user interface provides a two-dimensional map illustrating a location of the aircraft 100 relative to the geography, and may show locations of other aircrafts in the area. The map may furthermore illustrate virtual boundaries outside of which the flight control system will prevent the aircraft 100 from entering. In an embodiment implementation, an augmented-reality mode overlays information on a real-time view from an on-board camera. For example, the augmented-reality view may overlay air traffic information, airspace boundaries, and a maximum allowed range of the aircraft 100. Furthermore, "no-fly" areas corresponding to overly congested areas may be indicated as "no-fly" zones in the augmented-reality view.

Upon reading this disclosure, those of skill in the art will appreciate still additional alternative structural and functional designs for the disclosed embodiments from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the disclosed embodiments herein without departing from the scope.

The invention claimed is:

1. An electric aircraft comprising:
   an undercarriage comprising a plurality of floats enabling floatation of the electric aircraft;
   a cockpit over the undercarriage, the cockpit comprising a seat for securing a passenger within the electric aircraft and a windshield at least partially enclosing the cockpit;
   a canopy over the cockpit, the canopy comprising a structural frame and a plurality of distributed lifting devices that each include a rotor to provide lift to the electric aircraft, a motor to drive rotation of the rotor, and a battery pack to supply power to the motor, wherein the battery pack includes a first quick-swap mechanism for securely mating to a reciprocally structured second quick-swap mechanism of a terminal positioned on a portion of the structural frame below the motor; and
   an on-board electronic flight control system to control the distributed lifting devices in response to flight controls to carry out a flight of the electric aircraft.

2. The electric aircraft of claim 1, wherein the battery pack provides power to one and only one motor.

3. The electric aircraft of claim 1, wherein the first quick-swap mechanism comprises a set of cylindrical tenon studs on the battery pack that mate with corresponding keyhole slots of the terminal.

4. The electric aircraft of claim 3, wherein a first electrical connector on the battery pack mates with a second electrical connector of the terminal to establish an electrical connection when the first quick-swap mechanism of the battery pack is secured to the second quick-swap mechanism of the terminal.

5. The electric aircraft of claim 3, further comprising a safe lock mechanism including a pin insertable through a respective pin sleeve on the battery pack and the terminal that are aligned when the first quick-swap mechanism of the battery pack is secured to the second quick-swap mechanism of the terminal.

6. The electric aircraft of claim 3, further comprising a ballistic recovery system for landing the electric aircraft in an emergency event, the ballistic recovery system including:
   a parachute deployable from a compartment on the canopy;
   a deployment mechanism for causing the parachute to deploy, the deployment mechanism comprising a pair of push buttons positioned on respective handles within the cockpit, the deployment mechanism to deploy the parachute in response to the push buttons being concurrently activated for at least a predefined time period.

7. The electric aircraft of claim 6, wherein the on-board electronic flight control system is configured to disconnect power to the motors in response to deployment of the parachute.

8. The electric aircraft of claim 3, wherein the plurality of floats comprises:
   a central float directly under the cockpit; and
   four or more side floats distributed around the central float.

9. The electric aircraft of claim 3, wherein the on-board electronic flight control system comprises:
   an autonomous flight controller to automatically control at least a first aspect of the flight of the electric aircraft in accordance with a predefined flight plan, wherein the autonomous flight controller automatically imposes the set of constraints on the flight in accordance with the predefined flight plan by performing at least one of the following actions:
      controlling the electric aircraft to maintain a position within a predefined geographic region;
      controlling the electric aircraft to avoid a collision;
      controlling the electric aircraft to avoid entering a geographic area having over a threshold level of congestion;

controlling the electric aircraft to land according to a set of predefined landing maneuvers;
controlling the electric aircraft to initiate landing in response to predefined landing criteria;
controlling the electric aircraft to takeoff according to a set of predefined takeoff maneuvers;
controlling the electric aircraft to initiate takeoff in response to takeoff criteria; and
a manual flight controller to enable the passenger to provide manual control inputs to control at least a second aspect of the flight, wherein the manual flight controller enables the passenger to control the flight within the set of constraints imposed by the autonomous flight controller.

10. An electric aircraft comprising:
an undercarriage comprising a plurality of floats enabling floatation of the electric aircraft, wherein the plurality of floats comprises:
a central float directly under the cockpit; and
four or more side floats distributed around the central float;
a cockpit over the undercarriage, the cockpit comprising a seat for securing a passenger within the electric aircraft and a windshield at least partially enclosing the cockpit;
a canopy over the cockpit, the canopy comprising a structural frame and a plurality of distributed lifting devices that each include a rotor to provide lift to the electric aircraft, a motor to drive rotation of the rotor, and a battery pack to supply power to the motor; and
an on-board electronic flight control system to control the distributed lifting devices in response to flight controls to carry out a flight of the electric aircraft.

11. The electric aircraft of claim 10, wherein the plurality of floats comprises:
six side floats distributed around the central float.

12. The electric aircraft of claim 10, wherein the electric aircraft further comprises:
triple redundant on-board sensors for sensing data relevant to the flight, the triple redundant sensors including a primary sensor and two or more backup sensors, wherein one of the two or more backup sensors activates in response to failure of the primary sensor.

13. The electric aircraft of claim 10, wherein the on-board electronic flight control system comprises:
an autonomous flight controller to automatically control at least a first aspect of the flight of the electric aircraft in accordance with a predefined flight plan; and
a manual flight controller to enable the passenger to provide manual control inputs to control at least a second aspect of the flight.

14. The electric aircraft of claim 13,
wherein the autonomous flight controller automatically imposes a set of constraints on the flight in accordance with the predefined flight plan; and
wherein the manual flight controller enables the passenger to control the flight within the set of constraints imposed by the autonomous flight controller.

15. The electric aircraft of claim 14, wherein the autonomous flight controller automatically imposes the set of constraints by performing at least one of the following actions:
controlling the electric aircraft to maintain a position within a predefined geographic region;
controlling the electric aircraft to avoid a collision;
controlling the electric aircraft to avoid entering a geographic area having over a threshold level of congestion;
controlling the electric aircraft to land according to a set of predefined landing maneuvers;
controlling the electric aircraft to initiate landing in response to predefined landing criteria;
controlling the electric aircraft to takeoff according to a set of predefined landing takeoff maneuvers;
controlling the electric aircraft to initiate takeoff in response to takeoff criteria.

16. The electric aircraft of claim 10, further comprising a ballistic recovery system for landing the electric aircraft in an emergency event, the ballistic recovery system including:
a parachute deployable from a compartment on the canopy;
a deployment mechanism for causing the parachute to deploy, the deployment mechanism comprising a pair of push buttons positioned on respective handles within the cockpit, the deployment mechanism to deploy the parachute in response to the push buttons being concurrently activated for at least a predefined time period.

17. An electric aircraft comprising:
a cockpit comprising a seat for securing a passenger within the electric aircraft;
a canopy over the cockpit, the canopy comprising a structural frame and a lifting system comprising a plurality of rotors to provide lift to the electric aircraft, a plurality of motors to drive rotation of the plurality of rotors, and a power system to supply power to the plurality of motors; and
an on-board electronic flight control system to control the lifting system in response to flight controls to carry out a flight of the electric aircraft, wherein the on-board electronic flight control system comprises:
an autonomous flight controller to automatically control at least a first aspect of the flight of the electric aircraft in accordance with a predefined flight plan, wherein the autonomous flight controller automatically imposes the set of constraints on the flight in accordance with the predefined flight plan by performing at least one of the following actions:
controlling the electric aircraft to maintain a position within a predefined geographic region;
controlling the electric aircraft to avoid a collision;
controlling the electric aircraft to avoid entering a geographic area having over a threshold level of congestion;
controlling the electric aircraft to land according to a set of predefined landing maneuvers;
controlling the electric aircraft to initiate landing in response to predefined landing criteria;
controlling the electric aircraft to takeoff according to a set of predefined takeoff maneuvers;
controlling the electric aircraft to initiate takeoff in response to takeoff criteria; and
a manual flight controller to enable the passenger to provide manual control inputs to control at least a second aspect of the flight, wherein the manual flight controller enables the passenger to control the flight within the set of constraints imposed by the autonomous flight controller.

18. The electric aircraft of claim 17, further comprising a ballistic recovery system for landing the electric aircraft in an emergency event, the ballistic recovery system including:
a parachute deployable from a compartment on the canopy;

a deployment mechanism for causing the parachute to deploy, the deployment mechanism comprising a pair of push buttons positioned on respective handles within the cockpit, the deployment mechanism to deploy the parachute in response to the push buttons being concurrently activated for at least a predefined time period.

19. An electric aircraft comprising:

a cockpit comprising a seat for securing a passenger within the electric aircraft;

a canopy over the cockpit, the canopy comprising a structural frame and a lifting system comprising a plurality of rotors to provide lift to the electric aircraft, a plurality of motors to drive rotation of the plurality of rotors, and a power system to supply power to the plurality of motors; and an on-board electronic flight control system to control the lifting system in response to flight controls to carry out a flight of the electric aircraft;

a ballistic recovery system for landing the electric aircraft in an emergency event, the ballistic recovery system including:

a parachute deployable from a compartment on the canopy;

a deployment mechanism for causing the parachute to deploy, the deployment mechanism comprising a pair of push buttons positioned on respective handles within the cockpit, the deployment mechanism to deploy the parachute in response to the push buttons being concurrently activated for at least a predefined time period.

20. The electric aircraft of claim 19, wherein the cockpit further comprises a windshield, and wherein the handles are positioned proximate to opposite edges of the windshield.

21. The electric aircraft of claim 19, wherein the on-board electronic flight control system is configured to disconnect power to the motors in response to deployment of the parachute.

22. The electric aircraft of claim 19, wherein the on-board electronic flight control system automatically sends telemetry data from sensors of the electric aircraft to a ground controller.

* * * * *